United States Patent [19]

Harada et al.

[11] 4,451,196

[45] May 29, 1984

[54] TRANSFER APPARATUS

[75] Inventors: Yutaka Harada; Kouji Takai, both of Fuji, Japan

[73] Assignee: Tokyo Shibaura Denki Kabushiki Kaisha, Kawasaki, Japan

[21] Appl. No.: 395,310

[22] Filed: Jul. 6, 1982

[30] Foreign Application Priority Data

Jul. 8, 1981 [JP] Japan .................................. 56-106516

[51] Int. Cl.³ .............................................. B66C 1/00
[52] U.S. Cl. .................................... 414/733; 198/486; 414/752; 414/917
[58] Field of Search ............... 414/729, 733, 734, 737, 414/744 R, 744 B, 749, 752, 917, 736; 198/486; 74/126

[56] References Cited

U.S. PATENT DOCUMENTS

| | | | |
|---|---|---|---|
| 1,332,227 | 3/1920 | Norman | 414/917 X |
| 2,628,453 | 2/1953 | Pye et al. | 414/752 X |
| 3,061,118 | 10/1962 | Halberstadt | 414/917 X |

FOREIGN PATENT DOCUMENTS

| | | |
|---|---|---|
| 3129172 | 3/1982 | Fed. Rep. of Germany . |
| 54-159963 | 12/1979 | Japan . |
| 54-159964 | 12/1979 | Japan . |

Primary Examiner—Robert J. Spar
Assistant Examiner—Donald W. Underwood
Attorney, Agent, or Firm—Cushman, Darby & Cushman

[57] ABSTRACT

A transfer apparatus comprises a driving-side parallel link including first and second driving arms, a hydraulic actuator for swinging the first and second driving arms, a driven-side parallel link including first and second driven arms coupled with the first and second driving arms, respectively, suckers attached to the first and second driven arms to hold an object of transfer, a first transmission member attached to the first driving arm and having a cam follower for transmitting the swing displacements of the driving arms to the driven arms, and a second transmission member attached to the second driven arm and having a cam opening to engage the cam follower to receive the swing displacements of the driving arms through the cam follower.

15 Claims, 23 Drawing Figures

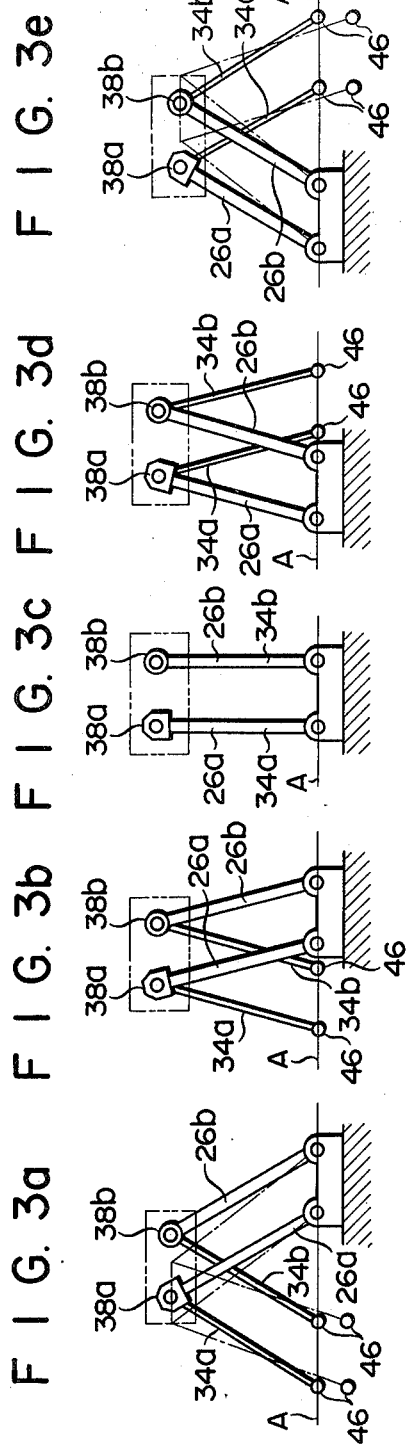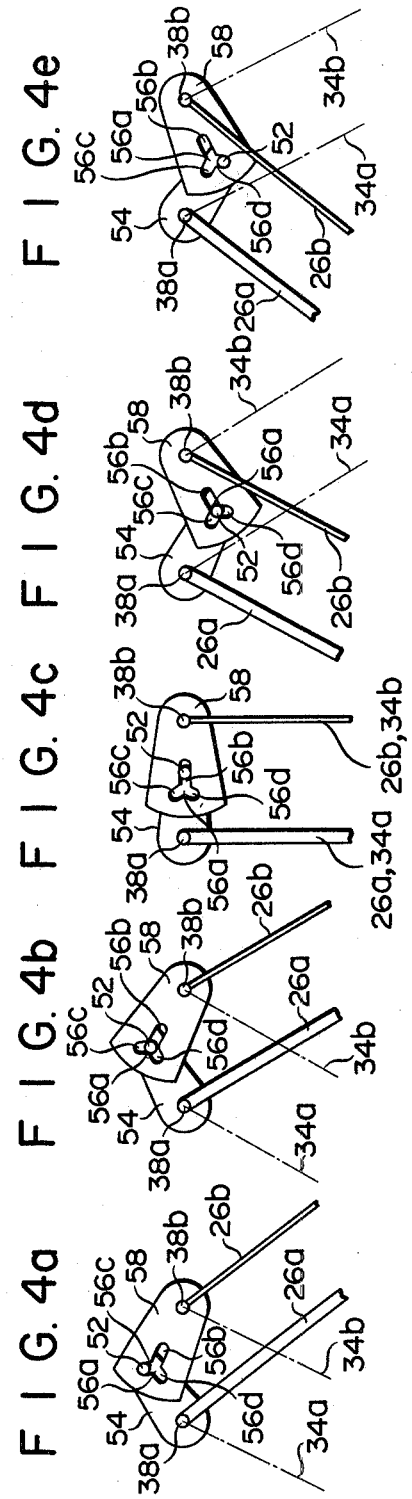

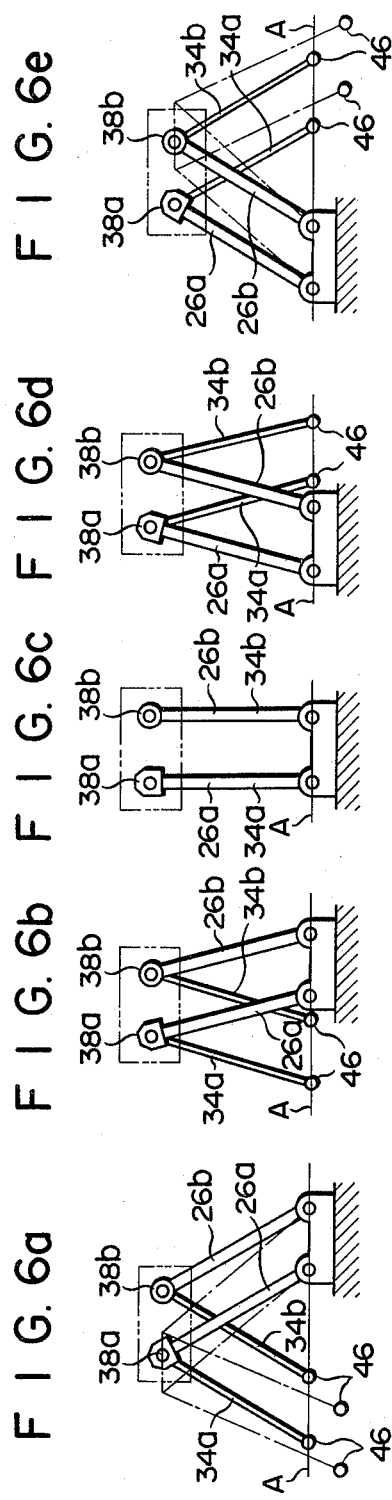
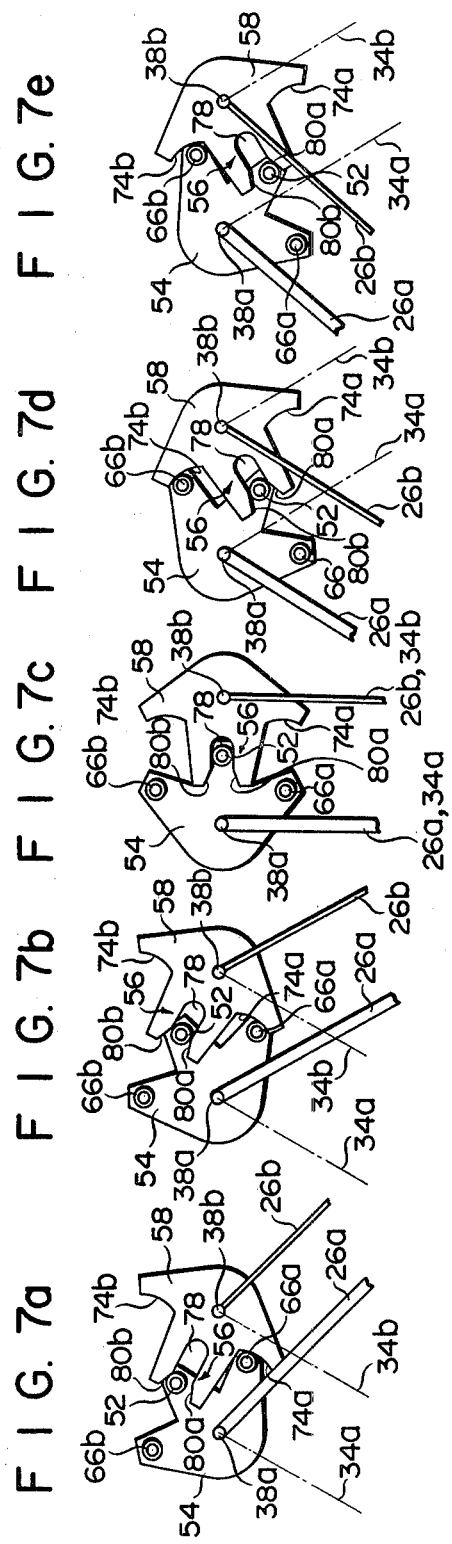

TRANSFER APPARATUS

BACKGROUND OF THE INVENTION

The present invention relates to a transfer apparatus, and more particularly to the joints of a transfer apparatus.

Recently various robots are employed in increasing number in the industries in order to save men-hours. One of the known robots is a transfer apparatus which feeds a plate to a press machine from one place. That is, the apparatus transfers a plate from one position to another.

Such a transfer apparatus is disclosed in Japanese Patent Disclosure (Kokai) No. 54-159963. Driven by one drive device, the apparatus lifts a thing, transfers it in horizontal direction to one position, and finally lowers it. The power of the drive device are transmitted to the movable members of the apparatus by various power transmitting members, such as sprockets and chains. Due to the use of these power transmitting members, the apparatus is inevitably massive as a whole. The chains will unavoidably elongate during a long use. As a result, a correct engagement between the sprockets and the chains will no longer possible. A faulty sprocket-chain engagement will result in vibration of the movable members of the transfer apparatus, especially at the start of every transfer operation. In consequence, the apparatus will transfer a thing to a position but a little off the desired position.

SUMMARY OF THE INVENTION

This invention was developed in consideration of these circumstances, and is intended to provide a high-reliability transfer apparatus, reduced in the number of components for simpler construction and capable of smooth, high accuracy transfer of an object.

According to one aspect of the invention, a transfer apparatus is provided which comprises a driving-side parallel link including a support member and first and second driving arms parallel to each other, the driving arms each having a pivotal portion pivotally supported on the support member and a coupling portion separated from the support member and swingable around the pivotal portion; drive means for swinging the first and second driving arms; a driven-side parallel link including a first driven arm having a pivotal portion coupled with the coupling portion of the first driving arm and a support portion separated from the pivotal portion toward the support member and swingable around the pivotal portion, a second driven arm having a pivotal portion coupled with the coupling portion of the second driving arm and a support portion separated from the pivotal portion toward the support member and swingable around the pivotal portion, and a coupling arm coupling the first and second driven arms parallel to each other; holding means attached to the support portions of the first and second driven arms to hold an object of transfer; and transmission means for transmitting swing displacements of the first and second driving arms to the first and second driven arms to displace the driven arms swingingly in accordance with the swing displacements of the driving arms. The transmission means includes a first transmission member attached to the first driving arm in the vicinity of the coupling portion of the first driving arm, the first transmission member having a cam follower for transmitting the swing displacements of the driving arms to the driven arms, and a second transmission member attached to the second driven arm in the vicinity of the pivotal portion of the second driven arm, the second transmission member having a cam opening to engage the cam follower to receive the swing displacements of the driving arms through the cam follower, whereby the driven arms are swung in the opposite direction to the swing direction of the driving arms to move the holding means onto a straight transfer line along the swing direction of the driving arms in the middle stage of the swing motion of the driving arms, and whereby the driven arms are swung in the same direction as the swing direction of the driving arms to move the holding means toward and away from the transfer line in the initial and final stages, respectively, of the swing motion of the driving arms.

Thus, according to the transfer apparatus of the invention, the first transmission member having the cam follower and the second transmission member having the cam opening are used for the transmission means. This transmission means, therefore, includes fewer components and is hence simplified in construction, thus having the advantages of light weight and compactness. According to this transfer apparatus, moreover, the transfer of the object of transfer is achieved by a single swing motion of each driving arm. Accordingly, the object can smoothly be transferred without a shock. Simplified in construction, as mentioned above, the transmission means is subject to less errors in operation attributable to dimensional errors, variations in engaging condition, etc. Thus, the transfer apparatus of the invention can perform high-accuracy transfer with high reliability.

BRIEF DESCRIPTION OF THE DRAWINGS

FIGS. 1 to 4e show a transfer apparatus according to one embodiment of this invention, in which:

FIG. 1 is a front view;

FIG. 2 is a partial enlarged front view; and

FIGS. 3a to 4e are schematic front views illustrating several processes of operation of the transfer apparatus.

FIGS. 5 to 7e show a transfer apparatus according to another embodiment of the invention, in which:

FIG. 5 is a partial enlarged front view; and

FIGS. 6a to 7e are schematic front views illustrating several processes of operation of the transfer apparatus.

DETAILED DESCRIPTION OF THE PREFERRED EMBODIMENT

Referring now to FIGS. 1 to 4e, one embodiment of this invention will be described in detail.

Figure 1:
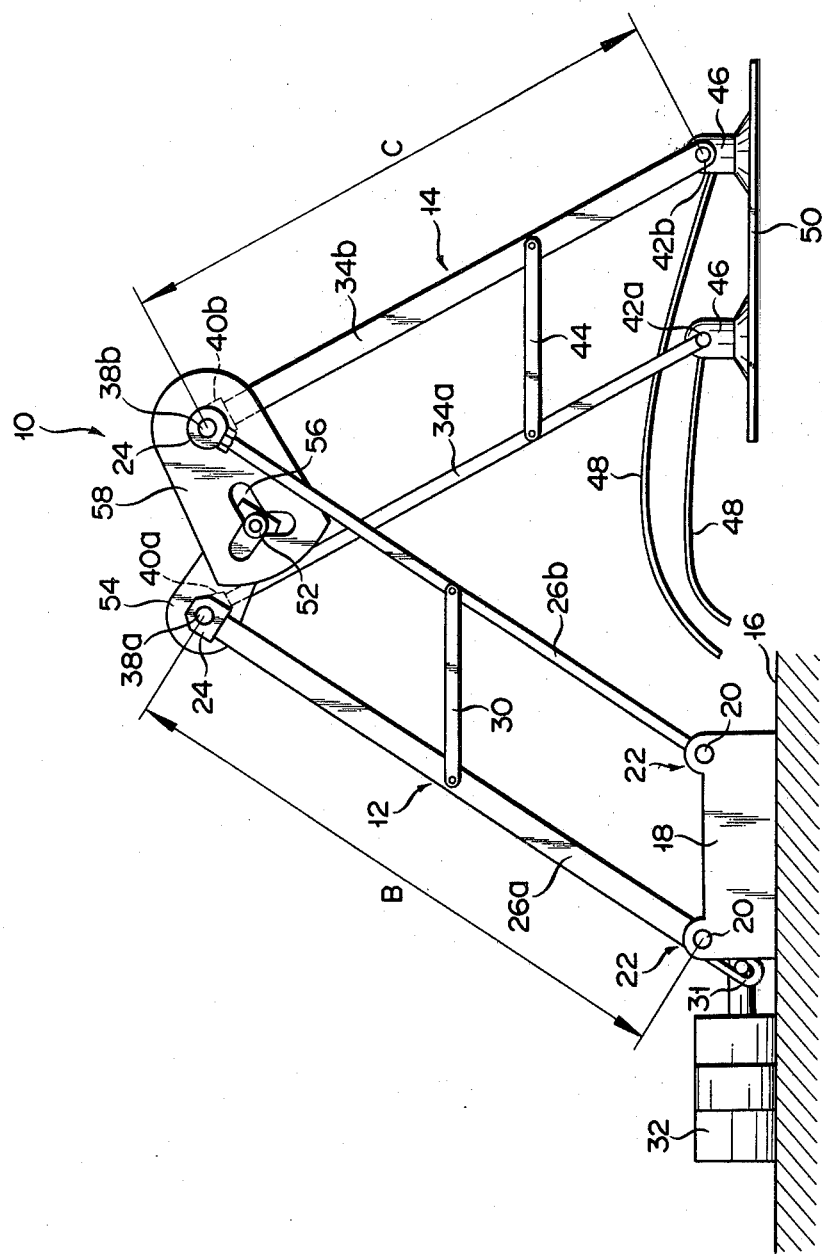

As shown in FIG. 1, a transfer apparatus 10 includes a driving-side parallel link 12 and a driven-side parallel link 14 coupled therewith. The driving-side parallel link 12 has a support member 18 fixed on a base 16, and first and second driving arms 26a and 26b in the form of parallel rods. Each driving arm has a pivotal portion 22 swingably supported on the support member 18 by means of a pin 20, and a coupling portion 24 separated upwardly from the support member 18 and swingable around the pivotal portion 22. The distance B between the pivotal portion 22 and the coupling portion 24 of the first driving arm 26a is equal to the distance between those of the second driving arm 26b. The pivotal portions 22 are supported horizontally in line with each other by means of their corresponding pins 20. The first and second driving arms 26a and 26b are coupled with each other by means of a coupling arm 30. The first driving arm 26a has a lower end portion 31 extending downward from the pivotal portion 22. The lower end portion 31 is connected to driving means, such as a hydraulic actuator 32, disposed on the base 16. The first and second driving arms 26a and 26b are driven by the hydraulic actuator 32 to swing parallel around the pins 20.

The driven-side parallel link 14 has a rod-shaped first driven arm 34a coupled to the first driving arm 26a and a rod-shaped second driven arm 34b coupled with the second driving arm 26b. The first driven arm 34a has a pivotal portion 40a swingably supported on the coupling portion 24 of the first driving arm 26a by means of a pivot 38a, and a support portion 42a separated downwardly from the pivotal portion 40a and swingable around the pivotal portion 40a. The second driven arm 34b has a pivotal portion 40b swingably supported on the coupling portion 24 of the second driving arm 26b by means of a pivot 38b, and a support portion 42b separated downwardly from the pivotal portion 40b and swingable around the pivotal portion 40b. The distance between the pivotal portion 40a and the support portion 42a of the first driven arm 34a is equal to the distance C between the pivotal portion 40b and the support portion 42b of the second driven arm 34b, as well as to the distance B between the coupling portion 24 and the pivotal portion 22 of the first driving arm 26a. In this embodiment, B=C=750 mm. The pivotal portions 40a and 40b are so supported by the pivots 38a and 38b, respectively, as to be horizontally in line with each other. The first and second driven arms 34a and 34b are coupled parallel to each other by means of a coupling arm 14. Suckers 46 as holding means are swingably attached to the support portions 42a and 42b of the first and second driven arms 34a and 34b, respectively. The suckers 46 are connected to a suction apparatus (not shown) by means of hoses 48 to hold an object of transfer, such as a plate 50, by the agency of sucking force from the suction apparatus.

Figure 2:
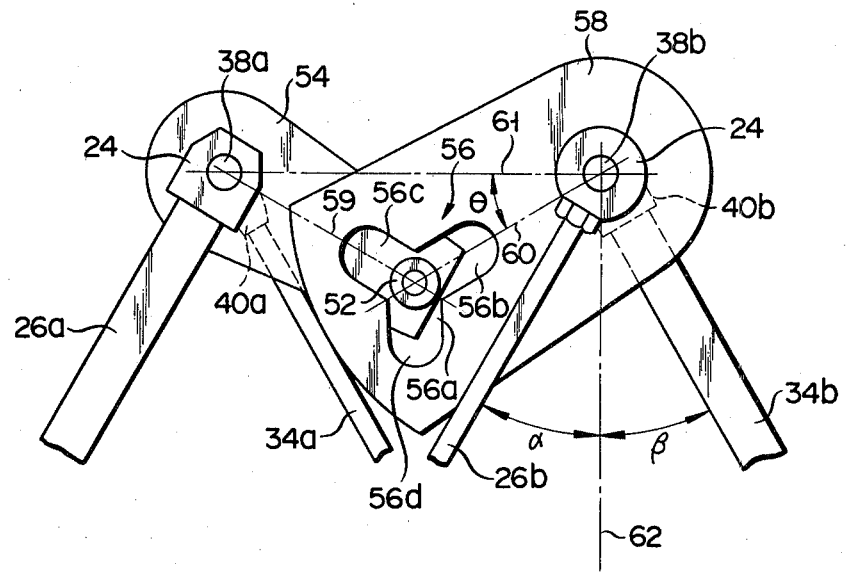

Referring now to FIG. 2, a cam section will be described which constitutes one of the important features of this invention. The cam section includes a first transmission member 54 having a cam follower 52 and fixed to the coupling portion 24 of the first driving arm 26a, and a second transmission member 58 having a cam opening 56 to engage the cam follower 52 and fixed to the pivotal portion 40b of the second driven arm 34b. The first and second transmission members 54 and 58 constitute transmission means for transmitting the swing displacements of the first and second driving arms 26a and 26b to the first and second driven arms 34a and 34b, thereby swinging the driven arms in accordance with such displacements of the driving arms. As seen from FIG. 2, the first transmission member 54 is plate-shaped, and is fixed to the coupling portion 24 of the first driving arm 26a between the coupling portion 24 and the pivotal portion 40a of the first driven arm 34a. The first transmission member 54 has an extended portion which extends from the coupling portion 24 toward the second driving arm 26b. The pivot 38a penetrates the first transmission member 54 to be projected on the back side thereof, and the pivotal portion 40a of the first driven arm 34a is supported on the projected portion of the pivot 38a. The cam follower 52 is pin-shaped, and is rotatably attached to the extended portion of the first transmission member 54, protruding on the front side of the drawing of FIG. 2. The cam follower 52 is so located that a straight line 59 passing through the respective centers of the cam follower 52 and the pivot 38a intersects the central axis of the first driving arm 26a at right angles. Further, the cam follower 52 is swung in synchronism with the first driving arm 26a around the pin 20 (see FIG. 1) supported the pivotal portion 22 of the first driving arm 26a.

The second transmission member 58 is plate-shaped, and is fixed to the pivotal portion 40b of the second driven arm 34b between the coupling portion 24 of the second driving arm 26b and the pivotal portion 40b. The second transmission member 58 has an extended portion which extends from the pivotal portion 40b toward the first driven arm 34a. The pivot 38b penetrates the second transmission member 58 to be projected on the front side of the drawing of FIG. 2, and the coupling member 24 of the second driving arm 26b is supported on the projected portion of the pivot 38b. The cam opening 56 is formed in the extended portion of the second transmission member 58. The cam opening 56 has a central portion 56a, and first, second and third straight portions 56b, 56c and 56d with their central axes extending radially from the central portion 56a. The widths of the first, second and third straight portions 56b, 56c and 56d are substantially equal to the diameter of the cam follower 52. The cam follower 52 is slidably fitted in and confined within the cam opening 56. As shown in FIG. 2, the first, second and third straight portions 56b, 56c and 56d are formed in the following manner, based on such a situation that the cam follower 52 is located in the central portion 56a. The first straight portion 56b is so formed that its central axis is located on a straight line 60 passing through the respective centers of the cam follower 52 and the pivot 38b. The cam follower 52 is so located that the straight line 60 intersects the central axis of the second driven arm 34b at right angles. The second and third straight portions 56c and 56d form a symmetrical configuration with respect to the straight line 60, and the second straight portion 56c is so formed that its central axis is located on the straight line 59 passing through the respective centers of the cam follower 52 and the pivot 38a. In the state indicated in FIG. 2, the distance between the center of the pivot 38a and the center of the cam follower 52 is equal to that between the center of the pivot 38b and the center of the cam follower 52. In this embodiment, an angle $\theta$ formed between the straight line 60 and a straight line 61 passing through the respective centers of the pivots 38a and 38b is 30°. Further, an angle $\alpha$ formed between the second driving arm 26b and a perpendicular line 62 passing through the pivot 38b, which is equal to an angle $\beta$ formed between the second driven arm 34b and the perpendicular line 62, is 30°.

The swing displacement of the first driving arm 26b is transmitted to the cam opening 56 through the cam follower 52. Receiving the swing displacement of the first driving arm 26b, the cam opening 56 transmits the displacement to the second driven arm 34b through the second transmission member 58 to swing the driven arms 34a and 34b in accordance with such displacement. As the first and second driving arms 26a and 26b are swung to cause the cam follower 52 to move in the first straight portion 56b, the first and second driven arms 34a and 34b are swung in the opposite direction to the swing direction of the first and second driving arms 26a and 26b. As a result, the suckers 46 (see FIG. 1) are moved horizontally on a predetermined transfer line along the swing direction of the driving arms. As the cam follower 52 moves in the second or third straight portion 56c or 56d, on the other hand, the first and second driven arms 34a and 34b are swung in the same direction as the swing direction of the first and second driving arms 26a and 26b. As a result, the suckers 46 are moved substantially vertically in a downward or upward direction from or to the transfer line.

Referring now to FIGS. 3a to 3e and FIGS. 4a to 4e, the operation of the transfer apparatus 10 of the construction described above will now be explained.

In FIG. 3a, the object (not shown) of transfer is held by the suckers 46 in such a state that the first and second driving arms 26a and 26b are in their respective initial positions as represented by one-dot chain lines. In this state, the cam follower 52 is located in the second straight portion 56c, as shown in FIG. 4a. Thereafter, when the first and second driving arms 26a and 26b are swung clockwise around their respective pivotal portions by the hydraulic actuator (see FIG. 1), the second transmission member 58 is swung clockwise around the pivot 38b by the cam follower 52 through the cam opening 56c. As a result, the first and second driven arms 34a and 34b are also swung clockwise around the pivots 38a and 38b, respectively. When the first and second driving arms 26a and 26b and the first and second driven arms 34a and 34b reach those respective positions represented by full lines in FIG. 3a, the cam follower 52 is located in the central portion 56a, as shown in FIG. 4b. In these processes of swing motion, the suckers 46 and the object of transfer held thereby are transferred substantially vertically in an upward direction onto the predetermined transfer line A. Thereafter, when the first and second driving arms 26a and 26b are further swung clockwise, the cam follower 52 enters the first straight portion 56b and moves therein. At the same time, the first and second driven arms 34a and 34b are swung counterclockwise around the pivots 38a and 38b, respectively, in accordance with the swing displacement of the cam follower 52. This causes the suckers 46 and the object of transfer to be transferred horizontally on the transfer line A along the swing direction of the first and second driving arms 26a and 26b. Thereafter, when the first and second driving arms 26a and 26b are swung clockwise to reach those respective upright positions shown in FIG. 3c via the positions shown in FIG. 3b, the first and second driven arms 34a and 34b also reach their respective upright positions. Then, the cam follower 52 falls horizontally in line with the pivots 38a and 38b, as shown in FIG. 4c. When the first and second driving arms 26a and 26b are further swung clockwise to reach those respective positions represented by full lines in FIG. 3e via the positions shown in FIG. 3d, the cam follower 52 moves in the first straight portion 56b to reach the central portion 56a. Meanwhile, the second transmission member 58 is swung counterclockwise around the pivot 38b by the cam follower 52 through the straight portion 56b, so that the first and second driven arms 34a and 34b are also swung counterclockwise. At the same time, the suckers 46 and the object of transfer are further transferred horizontally on the transfer line A. At the same time, moreover, the first and second driven arms 34a and 34b are subjected to clockwise swinging forces around the pivots 38a and 38b, respectively, by the weights of their own and of the object of transfer. Accordingly, when the cam follower 52 reaches the central portion 56a, the first and second driven arms 34a and 34b are swung clockwise by such swinging forces, and the cam follower 52 then enters the third straight portion 56d. Then, the first and second driving arms 26a and 26b and the first and second driven arms 34a and 34b reach their respective final positions as represented by one-dot chain lines in FIG. 3e, while the suckers 46 and the object of transfer are moved substantially vertically in a downward direction from the transfer line A. Thereafter, when the object of transfer is released from the hold by the suckers 46 by operating the suction apparatus, the transfer of the object is completed.

Thus, according to the transfer apparatus 10, the cam follower 52 moves in the second or third straight portion 56c or 56d in the initial or final stage of the swing motion of the driving arms 26a and 26b. At the same time, the object of transfer held by the suckers 46 is transferred upward or downward. In the middle stage of the swing motion of the driving arms 26a and 26b, on the other hand, the cam follower 52 moves in the first straight portion 56b. Then, the object of transfer is transferred horizontally on the transfer line A.

The length k of the first straight portion 56b used in the horizontal transfer motion is calculated by subtracting the distance between the cam follower 52 and the pivot 38b obtained when the cam follower 52 is in the position FIG. 4c where it is horizontally in line with the pivots 38a and 38b from that obtained when the cam follower 52 is located in the position of FIG. 4b where it is in the central portion 56a.

On the other hand, the lengths of the second and third straight portions 56c and 56d used in the up-and-down transfer motion is equal to or greater than the distance up-and-down moved of the object of transfer. Naturally, the lengths of the second and third straight portions 56c and 56d, as well as those of the first straight portion 56b and the second or third straight portion 56c or 56d, need not be equal. The distance up-and-down moved of the object of transfer can be varied by changing the swing angle of the driving arms 26a and 26b. Namely, if the driving arms 26a and 26b are further swung after the cam follower 52 reaches the center of the three straight portions, then the cam follower 52 lowers the second or third straight portion 56c or 56d according to its swing angle, thereby lowering the object of transfer vertically.

The distance L through which the object of transfer is transferred horizontally is given by $$L = 2(B \sin \alpha + C \sin \beta) \text{ (see FIGS. 1 and 2)}$$

In this embodiment, $B = C = 750$ mm and $\alpha = \beta = 30°$, so that the horizontal transfer distance L is $L = 1,500$ mm.

According to the transfer apparatus 10 thus constructed, the up-and-down transfer and horizontal transfer of the object of transfer are performed continuously through a single swing motion of each driving arm by transmitting the swing displacements of the driving arms 26a and 26b to the driven arms 34a and 34b with the aid of the cam follower 52 and the cam opening 56. Thus, the transfer of the object may be smoothly achieved without a shock. Moreover, the transmission means is composed of the first transmission member 54 having the cam follower 52 and the second transmission member 58 having the cam opening 58, which leads to reduction of components in number and hence to simplified construction. Accordingly, such transmission means has the advantage of light weight and compactness, and is subject to less errors in operation. In consequence, the transfer apparatus 10 can perform high-accuracy transfer with high reliability.

In the embodiment mentioned above, the driving arms 26a and 26b are described as being swung clockwise to transfer the object of transfer from left to right. Alternatively, however, the driving arms may be swung counterclockwise to transfer the object from right to left. It is to be understood that the values of B, C, θ, α and β used in the foregoing embodiment may be changed as required. Preferably, α and β should vary from 30° to 45°. Moreover, the transfer line A need not always be horizontal, and may be tilted by arranging the pivotal portions 22 of the driving arms 26a and 26b with a gradient.

Referring now to FIGS. 5 to 7e, a transfer apparatus 63 will be described according to another embodiment of this invention. In the description to follow, only the points of difference between the two embodiments will be described in detail. In FIGS. 5 to 7e, like reference numerals refer to the same members as those of the first embodiment.

Figure 5:
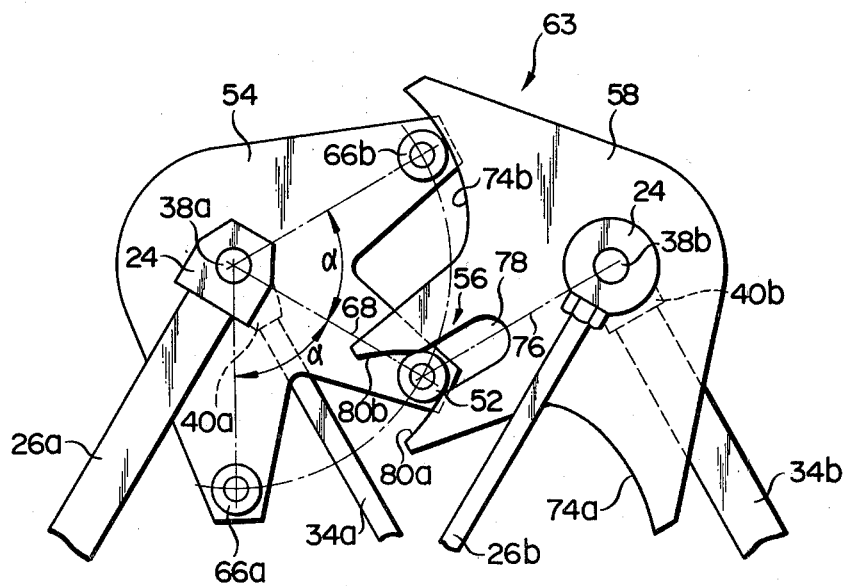

As shown in FIG. 5, a first transmission member 54 constituting transmission means has a cam follower 52 and first and second lock pins 66a and 66b attached to its extended portion. The cam follower 52 is so located that a straight line 68 passing through its center and the center of the pivot 38a intersects the central axis of the first driving arm 26a. The first and second lock pins 66a and 66b are severally located on a circular arc described around the pivot 38a and passing through the center of the cam follower 52. Each lock pin is separated from the cam follower 52 at an angular distance α on each side thereof. In this embodiment, α=60°. A second transmission member 58 constituting the transmission means has a cam opening 56 formed in its extended portion and capable of engaging the cam follower 52, and arcuate first and second cam surfaces 74a and 74b capable of engaging the first and second lock pins 66a and 66b on both sides of the cam opening 56, respectively. The cam opening 56 is so formed that its central axis is located on a straight line 76 passing through the center of the pivot 38b and intersecting the second driven arm 34b at right angles. Further, the cam opening 56 has a straight portion 78 and a pair of arcuate portions 80a and 80b communicating with the straight portion 78.

The swing displacements of the first and second driving arms 26a and 26b are transmitted to the cam opening 56 through the cam follower 52. Receiving the swing displacements of the first and second driving arms 26a and 26b, the cam opening 56 transmits them to the first and second driven arms 34a and 34b through the second transmission member 58, thereby swinging the driven arms in accordance with such swing displacements. As the first and second driving arms 26a and 26b are swung to move the cam follower 52 in the straight portion 78, the first and second driven arms 34a and 34b are swung in the opposite direction to the swing direction of the driving arms. As the cam follower 52 moves along the arcuate portion 80a or 80b, on the other hand, the first and second driven arms 34a and 34b are swung in the same direction as the swing direction of the first and second driving arms 26a and 26b. The first lock pin 66a engages the cam surface 74a to move along it as the cam follower 52 moves along the arcuate portion 80b, while the second lock pin 66b engages the cam surface 74b to move along it as the cam follower 52 moves along the arcuate portion 80a.

Referring now to FIGS. 6a to 7e, the operation of the transfer apparatus 63 will be described.

In FIG. 6a, an object (not shown) of transfer is held by the suckers 46 with the first and second driving arms 26a and 26b in their respective initial positions as represented by one-dot chain lines. In this state, the cam follower 52 engages the arcuate portion 80b, and the first lock pin 66a engages the cam surface 74a to lock the first and second driven arms 34a and 34b to their respective initial positions. Thereafter, when the first and second driving arms 26a and 26b are swung clockwise by drive means, the cam follower 52 is caused to move along the arcuate portion 80b toward the straight portion 78. As a result, the first and second driven arms 34a and 34b are swung clockwise, so that the object held by the suckers 46 is transferred obliquely upward to be put on the predetermined transfer line A. Thereafter, when the first and second driving arms 26a and 26b are further swung clockwise, as shown in FIGS. 6b and 6c, the cam follower 52 enters the straight portion 78 to move therein, as shown in FIGS. 7b and 7c. The first and second driven arms 34a and 34b are then swung counterclockwise to cause the object of transfer to be transferred horizontally on the transfer line A along the swing direction of the driving arms. Subsequently, when the first and second driving arms 26a and 26b are further swung to reach those respective positions represented by full lines in FIG. 6e via the positions shown in FIG. 6d, the cam follower 52 reaches the boundary between the straight portion 78 and the arcuate portion 80a, and the second lock pin 66b engages the cam surface 74b, as shown in FIG. 7d. Meanwhile, the first and second driven arms 34a and 34b are swung counterclockwise, and the object of transfer is transferred horizontally on the transfer line A. Thus, when the cam follower 52 reaches the position shown in FIG. 7d, the horizontal transfer is completed. Thereafter, the first and second driving arms 26a and 26b are further swung clockwise to reach those respective final positions represented by one-dot chain lines in FIG. 6e, while the cam follower 52 and the second lock pin 66b move along the arcuate portion 80a and the cam surface 74b, respectively, to reach their respective final positions as shown. At the same time, moreover, the first and second driven arms 34a and 34b are swung clockwise, so that the object of transfer is transferred obliquely downward from the transfer line A. Then, the first and second driven arms 34a and 34b are locked to their respective final positions by the second lock pin 66b. Thereafter, the hold of the object of transfer is removed, and thus the transfer of the object is completed.

Also with the transfer apparatus 63 of the aforementioned construction, like the foregoing embodiment, the up-and-down transfer and horizontal transfer of the object of transfer can be performed continuously through a single swing motion of each driving arm. Thus, the transfer of the object may be smoothly achieved without a shock. According to the transfer apparatus 63, moreover, the transmission means includes fewer components and is hence simplified in construction, thus having the advantages of light weight and compactness, as well as of fewer errors in operation. In consequence, the transfer apparatus 63 can perform high-accuracy transfer with high reliability.

What we claim is:

1. A transfer apparatus comprising:
   a driving-side parallel link including a support member and first and second driving arms parallel to each other, each driving arm having a pivotal portion pivotally supported on the support member and a coupling portion separated from the support member and swingable around the pivotal portion;

drive means for swinging the first and second driving arms;

a driven-side parallel link including a first driven arm having a pivotal portion coupled with the coupling portion of the first driving arm and a support portion separated from the pivotal portion of the first driven arm toward the support member and swingable around the pivotal portion of the first driven arm, a second driven arm having a pivotal portion coupled with the coupling portion of the second driving arm and a support portion separated from the pivotal portion of the second driven arm toward the support member and swingable around the pivotal portion of the second driven arm, and a coupling arm coupling the first and second driven arms parallel to each other;

holding means attached to the support portions of the first and second driven arms to hold an object of transfer; and transmission means for transmitting swing displacements of the first and second driving arms to the first and second driven arms to displace the driven arms swingingly in accordance with the swing displacements of the driving arms, the transmission means including a first transmission member attached to the first driving arm in the vicinity of the coupling portion of the first driving arm, the first transmission member having a cam follower for transmitting the swing displacements of the driving arms to the driven arms, and a second transmission member attached to the second driven arm in the vicinity of the pivotal portion of the second driven arm, the second transmission member having a cam opening to engage the cam follower to receive the swing displacements of the driving arms through the cam follower, whereby the driven arms are swung in the opposite direction to the swing direction of the driving arms to move the holding means onto a straight transfer line along the swing direction of the driving arms in the middle stage of the swing motion of the driving arms, and whereby the driven arms are swung in the same direction as the swing direction of the driving arms to move the holding means toward and away from the transfer line in the initial and final stages, respectively, of the swing motion of the driving arms.

2. The transfer apparatus according to claim 1, wherein said first and second driving arms are rod-shaped and are so designed that the distances between their respective pivotal portions and coupling portions are equal, and the first and second driven arms are rod-shaped and are so designed that the distances between their respective pivotal portions and support portions are equal.

3. The transfer apparatus according to claim 1 or 2, wherein said first transmission member is plate-shaped and attached to the coupling portion of the first driving arm, and has an extended portion extending from the coupling portion of the first driving arm toward the second driving arm.

4. The transfer apparatus according to claim 3, wherein said cam follower is attached to the extended portion of the first transmission member, and is so located that a straight line passing through the center of the cam follower and the coupling portion of the first driving arm intersects the first driving arm at right angles.

5. The transfer apparatus according to claim 4, wherein said second transmission member is plate-shaped and attached to the pivotal portion of the second driven arm, and has an extended portion extending from the pivotal portion of the second driven arm toward the first driven arm.

6. The transfer apparatus according to claim 5, wherein said cam opening is formed in the extended portion of the second transmission member, and has a central portion and first, second and third straight portions with their central axes extending radially from the central portion.

7. The transfer apparatus according to claim 6, wherein said first straight portion extends from the central portion toward the pivotal portion of the second driven arm, and is so formed that the central axis of the first straight portion passes through the pivotal portion of the second driven arm and intersects the second driven arm at right angles.

8. The transfer apparatus according to claim 7, wherein said second and third straight portions form a symmetrical configuration with respect to the central axis of the first straight portion, and the second straight portion is so formed that its central axis passes through the coupling portion of the first driving arm when the cam follower is located in the central portion.

9. The transfer apparatus according to claim 8, wherein said cam follower moves in the first straight portion in the middle stage of the swing motion of the first and second driving arms, and moves in the second and third straight portions in the initial and final stages, respectively, of the swing motion of the first and second driving arms.

10. The transfer apparatus according to claim 4, wherein said first transmission member has first and second lock pins for locking the first and second driven arms to their respective predetermined positions in the initial and final stages of the swing motion of the first and second driving arms, each lock pin being attached to the extended portion of the first transmission member and located on a circular arc described around the coupling portion of the first driving arm and passing through the center of the cam follower so as to be separated from the cam follower at a given angular distance on each side thereof.

11. The transfer apparatus according to claim 10, wherein said second transmission member is plate-shaped and attached to the pivotal portion of the second driven arm, and has an extended portion extending from the pivotal portion of the second driven arm toward the first driven arm.

12. The transfer apparatus according to claim 11, wherein said cam opening is formed in the extended portion of the second transmission member so that the central axis of the cam opening passes through the pivotal portion of the second driven arm and intersects the second driven arm at right angles.

13. The transfer apparatus according to claim 12, wherein said cam opening has a straight portion and a pair of arcuate portions communicating with the straight portion.

14. The transfer apparatus according to claim 13, wherein said second transmission member has first and second cam surfaces severally formed at the extended portion of the second transmission member and capable of engaging the first and second lock pins on both sides of the cam opening, respectively.

15. The transfer apparatus according to claim 14, wherein said cam follower moves in the straight portion of the cam opening in the middle stage of the swing motion of the first and second driving arms, and moves along one and the other of the arcuate portions in the initial and final stages, respectively, of the swing motion of the first and second driving arms.

* * * * *